US012693732B1

(12) United States Patent
Akuvan et al.

(10) Patent No.: US 12,693,732 B1
(45) Date of Patent: Jul. 28, 2026

(54) SYSTEM AND METHOD FOR PROVIDING REAL-TIME INSIGHTS TO USER

(71) Applicant: Akumen Artificial Intelligence Private Limited, Imphal (IN)

(72) Inventors: Thiyam Akuvan, Imphal (IN); Gyanendro Khomdram, Imphal West (IN); Thoudam Kheljeet Singh, Imphal West (IN); Oinam Roshan, Imphal (IN); Phijam Nongthanganba, Imphal West (IN)

(73) Assignee: Akumen Artificial Intelligence Private Limited (IN)

( * ) Notice: Subject to any disclaimer, the term of this patent is extended or adjusted under 35 U.S.C. 154(b) by 0 days.

(21) Appl. No.: 19/280,193

(22) Filed: Jul. 25, 2025

(51) Int. Cl.
| | |
|---|---|
| *G06F 3/01* | (2006.01) |
| *G06F 1/16* | (2006.01) |
| *G06V 10/764* | (2022.01) |
| *G06V 30/148* | (2022.01) |
| *G08B 21/04* | (2006.01) |
| *G08B 25/01* | (2006.01) |
| *G10L 13/08* | (2013.01) |

(52) U.S. Cl.
CPC .............. *G06F 3/011* (2013.01); *G06F 1/163* (2013.01); *G06V 10/764* (2022.01); *G06V 30/153* (2022.01); *G08B 21/0446* (2013.01); *G08B 25/016* (2013.01); *G10L 13/08* (2013.01)

(58) Field of Classification Search
None
See application file for complete search history.

(56) References Cited

U.S. PATENT DOCUMENTS

| | | | | |
|---|---|---|---|---|
| 2024/0078656 | A1* | 3/2024 | Pandya | G01S 17/42 |
| 2024/0370989 | A1* | 11/2024 | Pandya | G08B 21/043 |

FOREIGN PATENT DOCUMENTS

| | | |
|---|---|---|
| IN | 202441027867 A | 4/2024 |
| IN | 202411063106 A | 8/2024 |

(Continued)

OTHER PUBLICATIONS

"Dr. Adiline Macriga, AI-powered smart glasses for object detection, face recognition, and obstacle navigation for blind persons, Dec. 24, 2024, Macriga et al., The Patents Act, 1970 (39 of 1970) & The Patent Rules, 2003, pp. 1-20." (Year: 2024).*

(Continued)

*Primary Examiner* — Ifedayo B Iluyomade
(74) *Attorney, Agent, or Firm* — Jason C. Cameron

(57) ABSTRACT

The present invention discloses a system and a method for providing real-time insights to a user. The system obtains real-time sensor data. The system preprocesses the obtained real-time sensor data. The system analyses the real-time sensor data through machine learning models and artificial intelligence models. The system recognises obstacles in an environmental space. The system generates contextual responses for the user. The system provides processed feedback data including real-time haptic feedback and audio feedback. The system detects abrupt motion changes indicative of a fall event. The system provides an optimized processing performance on edge devices and servers. The system transmits alert notifications to preregistered emergency contacts upon detection of the abrupt motion changes. The system transfers the processed feedback data for providing the real-time insights to the user.

9 Claims, 7 Drawing Sheets

(56)    References Cited

FOREIGN PATENT DOCUMENTS

| | | |
|---|---|---|
| IN | 202441102920 A | 1/2025 |
| IN | 202511004408 A | 1/2025 |

OTHER PUBLICATIONS

"Dr. Adiline Macriga, AI-powered smart glasses for object detection, face recognition, and obstacle navigation for blind persons, Dec. 24, 2024, Macriga et al., The Patents Act, 1970 (39 of 1970) & The Patent Rules, 2003, pp. 1-20." (Year: 2024) (Year: 2024).*
https://www.robobionics.in/blog/how-smart-glasses-are-transforming-accessibility-for-the-blind/ ; How Smart Glasses Are Transforming Accessibility for the Blind ; Robobionics Content Writer.
https://www.letsenvision.com/glasses/home ; Envision Glasses; Envision; Copyright © Envision 2025.

* cited by examiner

100

200

200

300

Generate, by a plurality of sensors associated with each wearable device(s), real-time sensor data comprises at least one of: visual data, audio data, depth perception data, and motion tracking data 302

Control, by one or more first hardware processors associated with each wearable device(s), optimized electric power distribution from a power supply unit through a power management unit (PMU) to at least one of: the plurality of sensors, one or more haptic feedback units, one or more audio output units, one or more input control units, and a radio frequency (RF) communication unit 304

Transmit, by the one or more first hardware processors, the real-time sensor data via the radio frequency (RF) communication unit to at least one of: one or more edge devices and one or more servers 306

Obtain, by one or more second hardware processors associated with the one or more edge devices through a data obtaining subsystem, the real-time sensor data from each wearable device for on-device processing on the one or more edge devices 308

Preprocess, by the one or more second hardware processors through a data pre-processing subsystem, the obtained real-time sensor data, including at least one of: denoising the visual data, altering contrast in the visual data, filtering irrelevant audio data, normalising the depth perception data 310

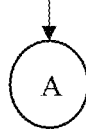

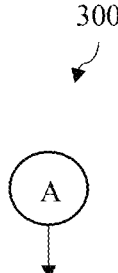

Analyse, by the one or more second hardware processors through a data processing subsystem, the real-time sensor data through at least one of: one or more machine learning models and one or more artificial intelligence models 312

Obtain, by one or more artificial intelligence (AI) data processing units (DPUs) associated with the one or more servers through a data acquisition subsystem, the pre-processed sensor data for the cloud-based processing in the one or more servers 314

Complex process, by the one or more artificial intelligence (AI) data processing units (DPUs) through a cloud data processing subsystem, the sensor data to generate the processed feedback data through at least one of: the one or more machine learning models, one or more large language models (LLMs), one or more conversational artificial intelligence models, one or more speech recognition models, and one or more text to speech models 316

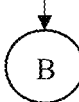

Figure 3
(Continue 2)

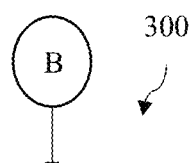

300

B

Optimise, by the one or more artificial intelligence (AI) data processing units (DPUs) through an artificial intelligence (AI) model optimization subsystem, at least one of: the one or more machine learning models, the one or more artificial intelligence models, the one or more large language models (LLMs), the one or more conversational artificial intelligence models, the one or more speech recognition models, and the one or more text to speech models, for providing an optimized processing performance on at least one of: the one or more edge devices and the one or more servers 318

Transmit, by a notification subsystem, one or more alert notifications to one or more preregistered emergency contacts with location coordinates of the user upon detection of the abrupt motion changes 320

Transfer, by a feedback subsystem, the processed feedback data to the radio frequency (RF) communication unit associated with each wearable device(s) 322

Receive, by the one or more first hardware processors associated with each wearable device(s), the processed feedback data from at least one of: the one or more edge devices and the one or more servers through the radio frequency (RF) communication unit to provide the one or more real-time insights to the user 324

Figure 3

SYSTEM AND METHOD FOR PROVIDING REAL-TIME INSIGHTS TO USER

EARLIEST PRIORITY DATE

This application claims priority from a Provisional patent application filed in India having patent application No. 202531059726, filed on Jun. 23, 2025 and titled "SYSTEM AND METHOD FOR PROVIDING REAL-TIME INSIGHTS TO USER".

FIELD OF INVENTION

Embodiments of the present invention relate to assistive technology and more particularly relate to a system and a method for providing one or more real-time insights to a user.

BACKGROUND

Smart glasses designed for assistive purposes have been evolving with advancements in computer vision, artificial intelligence (AI), and wearable technology. Several existing products provide functionalities such as object recognition, text-to-speech conversion, and augmented reality (AR)-based enhancements. The existing products aim to assist a user in navigating an environmental space by recognising one or more obstacles, reading text, and providing audio feedback. Nevertheless, the existing products suffer from several shortcomings that limit effectiveness in real-world scenarios.

One of the major limitations of current assistive smart glasses is the lack of real-time scene understanding. Most available devices rely on predefined object recognition models and optical character recognition (OCR)-based text reading, which may not provide a holistic environmental perception. Several existing products recognise the one or more obstacles and faces but may not provide LiDAR-based depth sensing and predictive obstacle detection. Some existing products depend on cloud-based AI processing, leading to latency and requiring a constant internet connection, which is not always feasible for the user in remote areas.

Furthermore, current smart glasses may not effectively incorporate multi-sensor fusion for improved navigation and safety. Most solutions rely solely on one or more visual data capturing units for vision-based assistance, neglecting depth perception and motion tracking technologies. This limitation makes the current smart glasses difficult to detect and interpret the one or more obstacles dynamically. Additionally, the current smart glasses lack an AI-driven fall detection system that may predict and alert one or more preregistered emergency contacts in case of an accident, a critical feature for the user.

An existing technology discloses an AI-powered smart glass for a visually impaired user, focusing on cost-effective implementation. However, the AI-powered smart glass lacks real-time multi-modal AI processing, LiDAR-based navigation, and predictive motion analysis. In another existing technology, an intelligent spectacular for the visually impaired user is disclosed. This system provides text-to-speech functionality and object detection but may not incorporate fall detection, emergency alerts, and machine learning-based adaptive navigation.

Despite various advancements in assistive technology, existing smart glasses fail to provide a fully integrated AI-driven solution for real-time navigation, obstacle detection, scene understanding, and emergency response. Current systems are limited by incomplete sensor integration, reliance on cloud computing, lack of predictive one or more AI models, and inadequate support for independent mobility.

Therefore, there is a need for a system that combines multi-sensor fusion, efficient AI-powered object recognition, real-time LiDAR-based navigation, predictive fall detection, and seamless on-device processing to enhance mobility, safety, and situational awareness for the user.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In order to overcome the above deficiencies of the prior art, the present disclosure is to solve the technical problem by providing a system for providing one or more real-time insights to a user.

In accordance with an embodiment of the present invention, the system for providing the one or more real-time insights to the user is disclosed. The system comprises one or more wearable devices, one or more second hardware processors associated with one or more edge devices, a memory unit, one or more artificial intelligence (AI) data processing units (DPUs) associated with one or more servers, and a high bandwidth memory unit. Each wearable device of one or more wearable devices comprises at least one of: a plurality of sensors and a first hardware processor. The memory unit is operatively connected to the one or more second hardware processors. The memory unit comprises a set of computer-readable instructions in form of a plurality of subsystems, configured to be executed by the one or more second hardware processors. The plurality of subsystems associated with the one or more edge devices comprises a data obtaining subsystem, a data pre-processing subsystem, a data processing subsystem, a notification subsystem, and a feedback subsystem.

The high bandwidth memory unit is operatively connected to the one or more AI DPUs. The high bandwidth memory unit comprises the set of computer-readable instructions in form of the plurality of subsystems, configured to be executed by the high bandwidth memory unit. The plurality of subsystems associated with the one or more servers comprises a data acquisition subsystem, a cloud data processing subsystem, and an artificial intelligence (AI) model optimization subsystem.

Yet in another embodiment, the one or more wearable devices are selected from a group comprises at least one of: a pair of smart glasses, a headgear, a headband, a chest-mounted device, a wearable pendant, a smart watch, an wrist worn device, a cane, shoes, and earbuds. The one or more real-time insights comprise at least one of: assistive navigation, scene understanding, real-time environmental interaction.

Yet in another embodiment, the plurality of sensors is configured to generate real-time sensor data comprises at least one of: visual data, audio data, depth perception data, and motion tracking data. The plurality of sensors comprises a visual data capturing unit, an audio input unit, an obstacle detection unit, and an inertial measurement unit (IMU). The visual data capturing unit is configured to capture the visual data in the environmental space. The audio input unit is configured to record ambient audio signals to generate the audio data for at least one of: speech recognition, sound classification, and environmental awareness. The obstacle detection unit is configured to generate the depth perception data by computing a distance between the user and the one or more obstacles for detecting the one or more obstacles in the environmental space. The IMU is configured to determine acceleration and orientation of the user for generating the motion tracking data.

Yet in another embodiment, the first hardware processor is operatively connected to the plurality of sensors. The first hardware processor is configured to: a) control optimized electric power distribution from a power supply unit through a power management unit (PMU) to at least one of: the plurality of sensors, one or more haptic feedback units, one or more audio output units associated with the plurality of sensors, one or more input control units, and a radio frequency (RF) communication unit, b) transmit the real-time sensor data via the radio frequency (RF) communication unit to at least one of: the one or more edge devices and the one or more servers, and c) receive processed feedback data from at least one of: the one or more edge devices and the one or more servers through the radio frequency (RF) communication unit.

Yet in another embodiment, the data obtaining subsystem is configured to obtain the real-time sensor data from each wearable device, for on-device processing on the one or more edge devices.

Yet in another embodiment, the data pre-processing subsystem is configured to preprocess the obtained real-time sensor data, including at least one of: denoising the visual data, altering contrast in the visual data, filtering irrelevant audio data, and normalising the depth perception data.

Yet in another embodiment, the data processing subsystem is configured to analyse the real-time sensor data through at least one of: one or more machine learning models and one or more artificial intelligence models. The data processing subsystem comprises at least one of: an object recognition module, an interaction response module, a navigation and obstacle detection module, and a fall detection module. The object recognition module is configured to recognise and classify the one or more obstacles in the environmental space by processing at least one of: the visual data, the depth perception data, and the motion tracking data through a convolutional neural network (CNN) including at least one of: an EfficientDet model, a MobileNet model, a You Only Look Once (YOLO) model which are optimized for the one or more edge devices as an on-device processing artificial intelligence model. The on-device processing artificial intelligence model is configured to provide the processed feedback data by combining at least one of: the visual data, the audio data, the depth perception data, and the motion tracking data, with natural language processing (NLP) procedures.

Yet in another embodiment, the interaction response module is configured to generate one or more contextual responses for the user by processing the visual data, the audio data through at least one of: one or more multi-modal artificial intelligence language models and one or more text recognition models. The one or more multi-modal artificial intelligence language models comprise at least one of: vision-language models, multi-modal transformer models and artificial intelligence (AI)-driven fusion networks. The one or more text recognition models comprise at least one of: optical character recognition (OCR), handwriting recognition models, and the one or more text to speech models.

Yet in another embodiment, the navigation and obstacle detection module is configured to provide the processed feedback data including at least one of: real-time haptic feedback and audio feedback, based on processing the depth perception data and the visual data through a predictive motion model. The predictive motion model comprises at least one of: recurrent neural network (RNN)-based motion prediction models, Kalman filtering-based motion estimation models, and light detection and ranging (LiDAR)-based dynamic movement tracking. The real-time haptic feedback comprises discrete vibration patterns. The discrete vibration patterns produced corresponding to various types of processed feedback data, including one of: proximity of the one or more obstacles and navigation instructions, allowing the user to distinguish between the discrete vibration patterns in the real-time haptic feedback.

Yet in another embodiment, the fall detection module is configured to detect abrupt motion changes indicative of a fall event based on the motion tracking data and vision-based gait analysis. The fall detection module comprises the vision-based gait analysis and a multi-sensor fusion procedure. The vision-based gait analysis is configured to detect abnormal walking patterns of the user to predict the fall event. The multi-sensor fusion procedure is configured to combine the motion tracking data, the visual data, and the depth perception data to alleviate false positives in detection of the abrupt motion changes.

Yet in another embodiment, the data acquisition subsystem is configured to obtain the pre-processed sensor data for the cloud-based processing in the one or more servers. Yet in another embodiment, the cloud data processing subsystem is configured with at least one of: the one or more machine learning models, one or more large language models (LLMs), one or more conversational artificial intelligence models, one or more speech recognition models, and one or more text to speech models, for complex processing of the sensor data to generate the processed feedback data. The one or more conversational artificial intelligence models comprise at least one of: the one or more large language models (LLMs), artificial intelligence (AI)-powered natural language understanding (NLU) modules, task-oriented dialogue models, and emotion-aware artificial intelligence (AI) models. The one or more speech recognition models comprise at least one of: end-to-end deep learning-based automatic speech recognition (ASR) models, noise-resistant speech-to-text models, multi-language voice recognition engines, and wake-word detection models.

Yet in another embodiment, the AI model optimization subsystem is configured to optimise at least one of: the one or more machine learning models, the one or more artificial intelligence models, the one or more LLMs, the one or more conversational artificial intelligence models, the one or more speech recognition models, and the one or more text to speech models, for providing an optimized processing performance on at least one of: the one or more edge devices and the one or more servers. The AI model optimization subsystem comprises a federated learning framework and a model compression engine. The federated learning framework is configured to train and update at least one of: the one or more machine learning models, the one or more artificial intelligence models, the one or more LLMs, the one or more conversational artificial intelligence models, the one or more speech recognition models, and the one or more text to speech models locally on the one or more edge devices while periodically synchronising updates with the one or more servers. The model compression engine is configured to dynamically condense size of at least one of: the one or more machine learning model and the one or more artificial intelligence models through at least one of: quantization and pruning to provide the optimized processing performance on the one or more edge devices.

Yet in another embodiment, the notification subsystem is configured to transmit one or more alert notifications to one or more preregistered emergency contacts with location coordinates of the user upon detection of the abrupt motion changes. Yet in another embodiment, the feedback subsystem is configured transfer the processed feedback data to the RF communication unit associated with each wearable device for providing the one or more real-time insights to the user.

In accordance with another embodiment of the present invention, a method for providing the one or more real-time insights to the user is disclosed. In the first step, the method includes generating, by the plurality of sensors associated with each wearable device, the real-time sensor data comprises at least one of: the visual data, the audio data, the depth perception data, and the motion tracking data.

In the next step, the method includes controlling, by the first hardware processor associated with each wearable device, the optimized electric power distribution from the power supply unit through the PMU to at least one of: the plurality of sensors, the one or more haptic feedback units, the one or more audio output units, the one or more input control units, and the RF communication unit.

In the next step, the method includes transmitting, by the first hardware processor, the real-time sensor data via the RF communication unit to at least one of: the one or more edge devices and the one or more servers.

In the next step, the method includes obtaining, by the one or more second hardware processors associated with the one or more edge devices through the data obtaining subsystem, the real-time sensor data from each wearable device, for the on-device processing on the one or more edge devices.

In the next step, the method includes preprocessing, by the one or more second hardware processors through a data pre-processing subsystem, the obtained real-time sensor data, including at least one of: denoising the visual data, altering contrast in the visual data, filtering the irrelevant audio data, normalising the depth perception data.

In the next step, the method includes analysing, by the one or more second hardware processors through a data processing subsystem, the real-time sensor data through at least one of: the one or more machine learning models and the one or more artificial intelligence models. The analysing comprises: a) recognising, by the object recognition module, the one or more obstacles in the environmental space by processing at least one of: the visual data, the depth perception data, and the motion tracking data through the CNN, b) generating, by the interaction response module, the one or more contextual responses for the user by processing the visual data, the audio data through at least one of: the one or more multi-modal artificial intelligence language models and the one or more text recognition models, c) providing, by the navigation and obstacle detection module, the processed feedback data including at least one of: the real-time haptic feedback and the audio feedback, based on processing the depth perception data, the visual data through the predictive motion model, and d) detecting, by the fall detection module, the abrupt motion changes indicative of the fall event based on the motion tracking data and the vision-based gait analysis.

In the next step, the method includes obtaining, by the one or more AI DPUs associated with the one or more servers through the data acquisition subsystem, the pre-processed sensor data for the cloud-based processing in the one or more servers.

In the next step, the method includes complex processing, by the one or more AI DPUs through the cloud data processing subsystem, the sensor data to generate the processed feedback data through at least one of: the one or more machine learning models, the one or more LLMs, the one or more conversational artificial intelligence models, the one or more speech recognition models, and the one or more text to speech models.

In the next step, the method includes optimising, by the one or more AI DPUs through the AI model optimization subsystem, at least one of: the one or more machine learning models, the one or more artificial intelligence models, the one or more LLMs, the one or more conversational artificial intelligence models, the one or more speech recognition models, and the one or more text to speech models, for providing the optimized processing performance on at least one of: the one or more edge devices and the one or more servers.

In the next step, the method includes transmitting, by the notification subsystem, the one or more alert notifications to the one or more preregistered emergency contacts with the location coordinates of the user upon detection of the abrupt motion changes.

In the next step, the method includes transferring, by the feedback subsystem, the processed feedback data to the RF communication unit associated with each wearable device.

In the next step, the method includes receiving, by the first hardware processor associated with each wearable device, the processed feedback data from at least one of: the one or more edge devices and the one or more servers through the RF communication unit to provide the one or more real-time insights to the user.

To further clarify the advantages and features of the present invention, a more particular description of the invention will follow by reference to specific embodiments thereof, which are illustrated in the appended figures. It is to be appreciated that these figures depict only typical embodiments of the invention and are therefore not to be considered limiting in scope. The invention will be described and explained with additional specificity and detail with the appended figures.

BRIEF DESCRIPTION OF THE DRAWINGS

The disclosure will be described and explained with additional specificity and detail with the accompanying figures in which:

FIG. 3 illustrates an exemplary flow diagram representation depicting a method for providing the one or more real-time insights to the user, in accordance with an embodiment of the present disclosure.

Figure 1A:
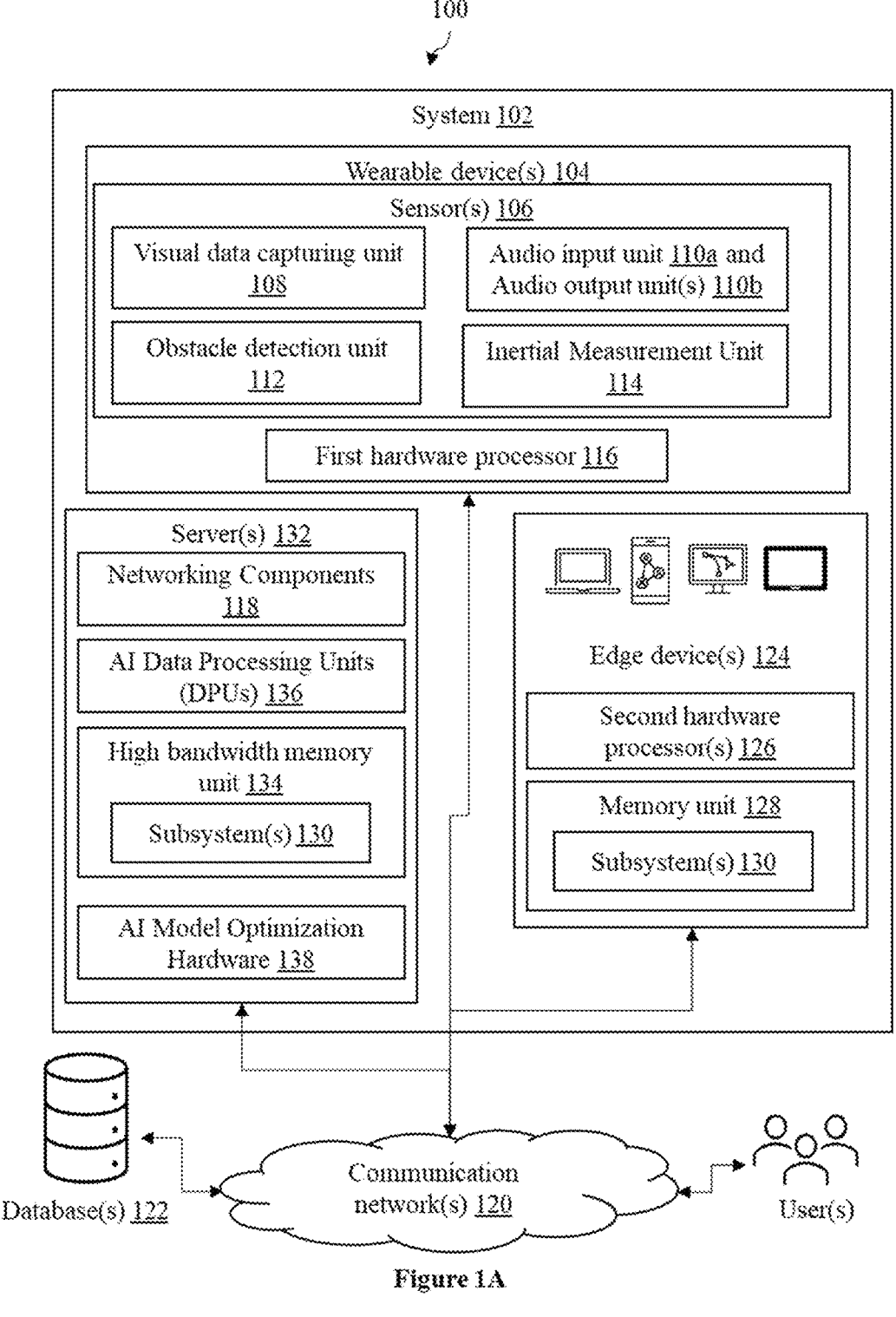
FIG. 1A illustrates an exemplary block diagram representation of a network architecture depicting a system for providing one or more real-time insights to a user, in accordance with an embodiment of the present disclosure.

Further, those skilled in the art will appreciate that elements in the figures are illustrated for simplicity and may not have necessarily been drawn to scale. Furthermore, in terms of the method steps, equipment and parameters used herein may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE PRESENT INVENTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more components preceded by "comprises . . . a" does not, without more constraints, preclude the existence of other components or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1A through FIG. 3, where similar reference characters denote corresponding features consistently throughout the figures, there are shown preferred embodiments, and these embodiments are described in the context of the following exemplary system and/or method.

Embodiments of the present invention relate to a system for providing one or more real-time insights to a user.

Figure 1B:
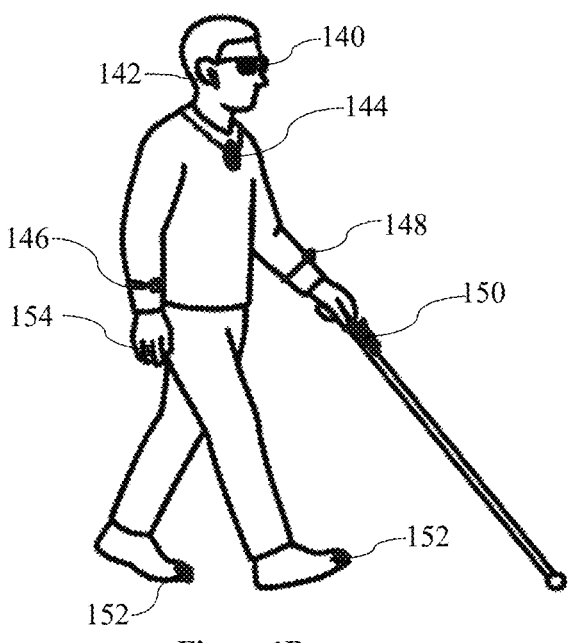
FIG. 1B illustrates an exemplary visual representation depicting the user with one or more wearable devices associated with the system, in accordance with an embodiment of the present disclosure.

FIG. 1A illustrates an exemplary block diagram representation of a network architecture 100 depicting the system 102 for providing the one or more real-time insights to the user, in accordance with an embodiment of the present disclosure; and FIG. 1B illustrates an exemplary visual representation depicting the user with one or more wearable devices 104 associated with the system 102, in accordance with an embodiment of the present disclosure According to an exemplary embodiment of the disclosure, the system 102 for providing the one or more real-time insights to the user is disclosed. The network architecture 100 may include the system 102 and one or more databases 122. The system 102 and the one or more databases 122 may be communicatively coupled via one or more communication networks 120, ensuring seamless data transmission, processing, and decision-making. The system 102 acts as a central processing unit within the network architecture 100, responsible for providing the one or more real-time insights to the user. The system 102 is configured to execute a set of computer-readable instructions that control a plurality of subsystems 130.

In an exemplary embodiment, the system 102 comprises one or more servers 132. The one or more servers 132 may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or one or more second hardware processors 126.

The one or more servers 132 are configured to process and manage data within the system 102. The one or more servers 132 may be digital computing devices, cloud-based computing platforms, or networked infrastructures. The one or more servers 132 may include, but are not limited to, at least one of: data centres, cloud computing instances, high-performance computing clusters, and dedicated artificial intelligence (AI) processing servers that enable seamless communication and data exchange with one or more edge devices 124.

The one or more servers 132 comprise networking components 118, one or more artificial intelligence (AI) data processing units (DPUs) 136, and a high-bandwidth memory unit 134. The high-bandwidth memory unit 134 is operatively connected to an AI model optimization hardware 138, facilitating efficient data storage and retrieval. The high-bandwidth memory unit 134 further include the plurality of subsystems 130 configured to execute complex AI-driven tasks, data analytics, and model optimization, enhancing the ability of the system 102 to process real-time sensor data with minimal latency.

The networking components 118 facilitate seamless data transmission between the one or more servers 132 and the one or more edge devices 124, ensuring low-latency communication for real-time processing. The one or more AI DPUs 136 are specialized hardware accelerators configured to handle complex machine learning and artificial intelligence workloads, enabling efficient inference and model execution. To support high-speed computations, the high-bandwidth memory unit 134 provides rapid data access and storage, reducing bottlenecks and enhancing overall system performance. The high-bandwidth memory unit 134 is operatively connected to the AI model optimization hardware 138, which fine-tunes at least one of: one or more machine learning models and one or more artificial intelligence (AI) models, for optimal efficiency, ensuring improved processing speed and accuracy across the system 102.

In an exemplary embodiment, the one or more edge devices 124 are configured to enable the user to interact with the system 102. The one or more edge devices 124 may be digital devices, computing devices, and/or networks. The one or more edge devices 124 may include, but not limited to, a mobile device, a smartphone, a personal digital assistant (PDA), a tablet computer, a phablet computer, a wearable computing device, a laptop, a desktop, and the like. The user may be, but not constricted to, at least one of: a visually impaired user, an elderly user, a cognitively impaired user, a physically disabled user, a general user, and the like.

The one or more edge devices 124 may comprise the one or more second hardware processors 126 and a memory unit 128. The memory unit 128 is operatively connected to the one or more second hardware processors 126. The memory unit 128 comprises the set of computer-readable instructions in the form of the plurality of subsystems 130, configured to be executed by the one or more second hardware processors 126.

In an exemplary embodiment, the one or more second hardware processors 126 may include, for example, microprocessors, microcomputers, microcontrollers, digital signal processors, central processing units, state machines, logic circuits, and/or any devices that manipulate data or signals based on operational instructions. Among other capabilities, the one or more second hardware processors 126 may fetch and execute computer-readable instructions in the memory unit 128 operationally coupled with the system 102 for performing tasks such as data processing, input/output processing, and/or any other functions. Any reference to a task in the present disclosure may refer to an operation being or that may be performed on data. The one or more second hardware processors 126 are high-performance processors capable of handling large volumes of data and complex computations. The one or more second hardware processors 126 may be, but not limited to, at least one of: multi-core central processing units (CPU), graphics processing units (GPUs), and the like, that enhance an ability of the system 102 to process real-time data from one or more sources simultaneously.

In an exemplary embodiment, the one or more databases 122 may be configured to store and manage data related to various aspects of the system 102. The one or more databases 122 may store at least one of, but not limited to, information of environments, the real-time sensor data, information associated with the one or more wearable devices 104, any other information necessary for the functionality and optimization of the system 102, and the like. The one or more databases 122 serve as a centralized repository for critical data elements that are integral to the secure operation of the system 102, enabling generation of the one or more real-time insights for the user. The one or more databases 122 enable the system 102 to dynamically retrieve, analyse, and update the stored data in real-time, for providing the one or more real-time insights to the user. The one or more databases 122 may include different types of databases such as, but not limited to, relational databases (e.g., Structured Query Language (SQL) databases such as PostgresDB and Oracle® databases), non-Structured Query Language (NoSQL) databases (e.g., MongoDB, Cassandra), time-series databases (e.g., InfluxDB), an OpenSearch database, object storage systems (e.g., Amazon® S3), and the like.

In an exemplary embodiment, the one or more communication networks 120 may be, but not limited to, a wired communication network and/or a wireless communication network, a local area network (LAN), a wide area network (WAN), a Wireless Local Area Network (WLAN), a metropolitan area network (MAN), a telephone network, such as the Public Switched Telephone Network (PSTN) or a cellular network, an intranet, the Internet, a fibre optic network, a satellite network, a cloud computing network, a combination of networks, and the like. The wired communication network may comprise, but not limited to, at least one of: Ethernet connections, Fiber Optics, Power Line Communications (PLCs), Serial Communications, Coaxial Cables, Quantum Communication, Advanced Fiber Optics, Hybrid Networks, and the like. The wireless communication network may comprise, but not limited to, at least one of: wireless fidelity (wi-fi), cellular networks (including fourth generation (4G) technologies and fifth generation (5G) technologies), Bluetooth®, ZigBee®, long-range wide area network (LoRaWAN), satellite communication, radio frequency identification (RFID), 6G (sixth generation) networks, advanced IoT protocols, mesh networks, non-terrestrial networks (NTNs), near field communication (NFC), and the like.

Each wearable device 104 of the one or more wearable devices 104 is configured with one or more wireless communication modules that enable each wearable device 104 to connect with the one or more edge devices 124 and networks for data exchange. The Bluetooth® and the wi-fi allows for seamless pairing with the one or more edge devices 124, enabling the user to control the one or more wearable devices 104 via a mobile application.

In an exemplary embodiment, each wearable device 104 of the one or more wearable devices 104 comprises, but not limited to, at least one of: a plurality of sensors 106, a first hardware processor 116, and the like. The one or more wearable devices 104 are selected from a group that comprises, but not restricted to, at least one of: a pair of smart glasses 140, a headgear, a headband, a chest-mounted device, a wearable pendant 144, a smart watch 148, an wrist worn device 146, a cane 150, shoes 152, earbuds 142, a smart belt, haptic gloves, smart rings 154, a neckband device, an ankle band, and the like, thereby providing flexibility in configuration to suit different user preferences and needs.

In another exemplary embodiment, a wearable device 104 of the one or more wearable devices 104 is integrated into a spectacle frame of the pair of smart glasses 140. The spectacle frame may be configured with, but not restricted to, at least one of: one or more cameras, a Light Detection and Ranging (LiDAR) sensor, haptic motors, an accelerometer, and speakers placed on both sides of a temple of the spectacle frame. The wearable device 104 may be one of: worn as the pendant 144 and attached using a pin. This wearable device 104 may include, but not restricted to, at least one of: the camera, the haptic motors, the speakers, the LiDAR sensor, and the accelerometer. A wrist-worn wearable device 104 in a form factor of the smart watch 148, and the like, may be equipped with, but not restricted to, at least one of: the camera, the speakers, the haptic motors, the LiDAR sensor, and the accelerometer. The wearable device 104 is configured to attach to the cane 150 used by the user. The cane 150 may feature, but not restricted to, at least one of: the camera, the haptic motors, the speakers, the LiDAR sensor, and the accelerometer. The wearable device 104 may be attached to a front of shoes 152 of the user. The shoes 152 may incorporate the LiDAR sensor and the haptic motors to aid in obstacle detection. The compact wearable device 104 in the form of the earbuds 142 may include, but not restricted to, at least one of: the camera, the speakers, the LiDAR sensor, and the accelerometer for seamless audio interaction and spatial awareness.

The disclosed one or more wearable devices 104 are configured to operate one of: independently and in coordination with one another wearable devices 104. The disclosed one or more wearable devices 104 are configured not only to function independently but also to work in synergy to enhance mobility, spatial awareness, and safety for the user. Each wearable device 104 of the one or more wearable devices 104 provides specialized capabilities tailored to different forms of usage (head-mounted, wrist-worn, shoe-attached, earbud-based, and cane-integrated), and the functionality may be significantly enhanced when used in conjunction. These one or more wearable devices 104 may communicate seamlessly with one another using wireless protocols such as the Bluetooth®, the wi-fi, and other connected technologies. For instance, the user may wear the pair of smart glasses 140, the smart watch 148, the earbuds 142, and shoe sensors simultaneously. The pair of smart glasses 140 may interpret object recognition and scene understanding, the earbuds 142 may provide directional audio feedback and voice guidance, while the smart watch 148 tracks hand gestures and motion, and the shoe sensors detect ground-level obstacles.

If the one or more wearable devices 104 are one of: temporarily inactive and removed, other one or more wearable devices 104 may independently continue to provide navigation support, alerts, and voice feedback. The shoe sensors may alert the user to low-lying obstacles, while the wearable pendant 144, the pair of smart glasses 140, and the earbuds 142 may process and describe upper-body level hazards and read signage through camera-based Optical Character Recognition (OCR) and Artificial Intelligence (AI).

Based on environmental context (e.g., indoors, crowded street, and open area), the one or more wearable devices 104 may prioritize different sensors and adjust haptic feedback and audio feedback dynamically, ensuring optimized performance. The one or more wearable devices 104 may one of: connect with a smartphone application and operate on a peer-to-peer mesh, allowing shared computation and real-time coordinated alerts. This integrated configuration ensures not just modularity and user flexibility but also a robust assistive ecosystem that scales according to the needs and preferences of each user.

The one or more real-time insights may include, but not constricted to, at least one of: assistive navigation for guiding the user efficiently through surroundings, scene understanding for identifying one or more obstacles and contextual elements within an environmental space, real-time environmental interaction to enhance user awareness and responsiveness to dynamic changes, and the like.

In an exemplary embodiment, the plurality of sensors 106 is configured to generate the real-time sensor data, including, but not constricted to, at least one of: visual data, audio data, depth perception data, motion tracking data, and the like. The plurality of sensors 106 work together to enhance the ability of the system 102 to interpret the environmental space and provide meaningful feedback to the user. The plurality of sensors 106 may comprise, but not restricted to, at least one of: a visual data capturing unit 108, an audio input unit 110a, one or more audio output units 110b, an obstacle detection unit 112, an inertial measurement unit (IMU) 114, and the like.

The visual data capturing unit 108 (e.g., a high-resolution camera, Red Green Blue (RGB) camera) is configured to capture the visual data (real-time images and videos) of the environmental space. The user captures the real-time images and videos through each wearable device 104, generating the visual data that assists in scene understanding and object recognition. The visual data capturing unit 108 captures the visual data of the surroundings of the user. The visual data capturing unit 108 serves as a primary input for at least one of: detecting the one or more obstacles, reading text, and understanding the environmental space.

The audio input unit 110a (e.g., a microphone) is configured to record ambient audio signals to generate the audio data, thereby enabling functionalities such as, but not limited to, at least one of: speech recognition, sound classification, environmental awareness, and the like. In one embodiment, one or more audio input units may be employed that are strategically positioned on the one or more wearable devices 104 to capture voice commands from the user as well as ambient sounds. The one or more audio input units allow the user to interact with the one or more wearable devices 104 through the voice commands and are essential for enabling features such as the speech recognition.

The obstacle detection unit 112 is configured to generate the depth perception data by calculating a distance between the user and surrounding one or more obstacles, thereby facilitating real-time obstacle detection in the environmental space. The IMU 114 is configured to enhance the functionality of the system 102 by tracking an acceleration and an orientation of the user, ensuring accurate motion tracking. The IMU 114 is configured to generate the motion tracking data. By integrating the plurality of sensors 106, the one or more wearable devices 104 provide a comprehensive assistive solution that improves navigation, the object recognition, and situational awareness for the user.

In another exemplary embodiment, the plurality of sensors 106 may include, but not limited to, at least one of: an accelerometer and a gyroscope for generating the motion tracking data. The accelerometer measures linear acceleration (movement along X, Y, and Z axes) to detect at least one of: motion, tilt, and free fall. The gyroscope measures angular velocity (rotation around X, Y, and Z axes), thereby assisting in tracking the orientation and a rotational motion. At least one of: the accelerometer and the gyroscope are configured to detect the movement and orientation of the one or more wearable devices 104. At least one of: the accelerometer and the gyroscope track head movements, which may be used for hands-free navigation. At least one of: the accelerometer and the gyroscope determine the orientation of the user and a direction of movement, assisting in more precise navigation and the object detection.

The plurality of sensors 106 may also include the Light Detection and Ranging (LiDAR) sensor for capturing accurate depth perception data (point cloud data) and one or more ambient light sensors for adapting to varying lighting conditions. The LiDAR sensor is embedded in front of the one or more wearable devices 104, which employs laser pulses to measure the distance between the one or more obstacles and the user. The LiDAR sensor may provide precise distance measurements by emitting the laser pulses and calculating the time the laser pulses take to return. The LiDAR sensor provides one of: single-point and multipoint depth estimations, depending on the LiDAR variant used.

The LiDAR sensor supports a field of view up to 65 degrees and distance coverage up to several meters. This method is ideal for real-time obstacle detection and close-range navigation. The one or more ambient light sensors are configured to detect the lighting conditions around the user. The one or more ambient light sensors optimize visual data capture and the object recognition in various lighting environments.

In an alternative embodiment, the depth perception data assists the user in understanding the surroundings better and navigating safely. The system 102 may employ other depth estimation techniques, including, but not limited to, at least one of: monocular depth estimation, binocular stereo vision, and the like. The monocular depth estimation utilizes a single onboard camera to estimate depth from two-dimensional (2D) images using advanced one or more AI models such as Depth Anything, Monocular Depth Estimation for Autonomous Systems (MiDaS), and the like. The one or more AI models may run directly on one of: the one or more wearable devices 104 if computational resources permit and the one or more edge devices 124. The system 102 leverages visual cues such as object sizes, shading, and texture gradients to infer distances. This technique is beneficial due to minimal hardware requirements and the ability to retrofit into existing one or more wearable devices 104. The binocular stereo vision utilizes two spatially separated cameras to simulate human binocular vision. By comparing the disparity between the images captured by the two cameras, the system 102 calculates depth information. This approach provides dense depth maps and is particularly effective in detecting medium-range to long-range obstacles and creating a three-dimensional (3D) understanding of the environment.

In an exemplary embodiment, the first hardware processor 116 serves as a central processing hub of each wearable device 104, managing the operation of the plurality of sensors 106 and components to ensure seamless functionality. The first hardware processor 116 is operatively connected to the plurality of sensors 106. The first hardware processor 116 is configured to optimize electric power distribution. The first hardware processor 116 achieves the electric power distribution through a power management unit (PMU), which allocates electric power from a power supply unit (e.g., a battery) to at least one of: the plurality of sensors 106, one or more haptic feedback units, one or more audio output units 110*b*, one or more input control units, a radio frequency (RF) communication unit, and the like.

In an alternative embodiment, the first hardware processor 116 may include, but not restricted to, one of: a microcontroller, a microprocessor unit, an embedded processing unit, System on Chip (SoC), and the like. The first hardware processor 116 may comprise a combination of at least one of: the microcontroller, the microprocessor, and a hardware accelerator, including, but not restricted to, at least one of: a Neural Processing Unit (NPU), a Vision Processing Unit (VPU), a Tensor Processing Unit (TPU), a Graphics Processor Unit (GPU), Application-Specific Integrated Circuits (ASICs), Field-Programmable Gate Arrays (FPGAs), and the like.

In another exemplary embodiment, the first hardware processor 116 may be implemented as an independent, compact computing unit, potentially in a small form factor comparable to a power bank, suitable for portability, such as being carried in a pocket. In certain embodiments, the first hardware processor 116 embedded within the one or more wearable devices 104 may establish a wired connection with the one or more second hardware processors 126. Due to the inherent limitations in battery capacity and computational power of the first hardware processor 116, computationally intensive tasks may be offloaded to one of: the one or more edge devices 124 and the one or more servers 132, thereby enhancing overall system performance while preserving the power efficiency.

A lightweight, rechargeable power supply unit is integrated into a frame of the pair of smart glasses 140, along with the PMU. The power supply unit powers the one or more wearable devices 104, ensuring that the one or more wearable devices 104 operate for extended periods without needing frequent recharges. By dynamically regulating the electric power distribution, the PMU enhances energy efficiency, prolonging power supply unit life while ensuring continuous operation of the obstacle detection, audio feedback, and environmental awareness.

The one or more wearable devices 104 may also be integrated with one or more haptic motors that may alert the user with discrete vibration patterns. The one or more haptic feedback units are configured to provide tactile vibrations to alert the user about nearby one or more obstacles and navigation cues. The one or more audio output units 110*b* (e.g., one or more speakers) are configured to deliver real-time verbal feedback, including, but not limited to, at least one of: object descriptions, navigation directions, scene insights, and the like. The one or more audio output units 110*b* are operatively positioned on either side of a frame near temples associated with the pair of smart glasses 140 to provide audio feedback to the user.

The one or more input control units are configured to allow the user to interact with the one or more wearable devices 104 through at least one of: touch, the voice commands, gesture-based controls, and the like. The one or more wearable devices 104 are also configured with, but not limited to, at least one of: a user interface (UI) control for intuitive interaction, a Light Emitting Diode (LED) flashlight for enhanced visibility in low-light situations, a status indicator, and the like. One or more buttons and one or more touch panels are located on the frame and sides of the pair of smart glasses 140. These physical controls allow the user to interact with the one or more wearable devices 104 through simple gestures, such as tapping and swiping to switch between modes (e.g., object detection, text reading, navigation). The voice commands and hand gestures may also be used as an alternative interface for hands-free control. One or more touch controls are integrated into the one or more wearable devices 104, thereby allowing for intuitive user input and state management.

The LED flashlight turns on automatically with adjusted intensity when the visual data capturing unit 108 detects low-light conditions, ensuring that the visual data is well-lit in darker environments. LED indicators blink in different patterns and colours for specific types of notifications (e.g., blinking red for low battery charge, blue for power on, and the like.). The RF communication unit is configured to enable wireless data exchange between each wearable device 104 and at least one of: the one or more edge devices 124 and the one or more servers 132 for real-time processing.

Beyond power management, the first hardware processor 116 facilitates real-time sensor data transmission and processing by leveraging the RF communication unit. The first hardware processor 116 transmits the real-time sensor data to at least one of: the one or more edge devices 124 and the one or more servers 132 (cloud-based servers) for advanced computational processing, enabling complex AI-driven analysis for enhanced scene understanding and navigation. Once processed, feedback data such as, but not limited to, at least one of: navigation instructions, obstacle alerts, contextual scene descriptions, and the like are received back from at least one of: the one or more edge devices 124 and the one or more servers 132 via the RF communication unit. This two-way data exchange allows the one or more wearable devices 104 to deliver the one or more real-time insights to the user, ensuring a highly interactive and adaptive assistive experience tailored for the user.

The system 102 intelligently identifies the one or more obstacles and provides real-time auditory feedback to the user. The one or more wearable devices 104 provide identify of the detected one or more obstacles via the one or more audio output units 110*b* for user awareness. When the LiDAR sensor detects the one or more obstacles within 1.5 meters, the system 102 promptly issues a warning sound, ensuring proactive alerts. As the user moves closer to the one or more obstacles, the warning sound intensifies, enhancing situational awareness and safety.

In an exemplary embodiment, the system 102 may be implemented by way of a single device or a combination of multiple devices that may be operatively connected or networked together. The system 102 may be implemented in hardware or a suitable combination of hardware and software.

Though few components and the plurality of subsystems 130 are disclosed in FIG. 1, there may be additional components and subsystems which is not shown, such as, but not limited to, ports, routers, repeaters, firewall devices, network devices, the one or more databases 122, network attached storage devices, assets, machinery, instruments, facility equipment, emergency management devices, image capturing devices, any other devices, and combination thereof. The person skilled in the art should not be limiting the components/subsystems shown in FIG. 1. Although FIG. 1 illustrates the system 102, and the one or more edge devices 124 connected to the one or more databases 122, one skilled in the art can envision that the system 102, and the one or more edge devices 124 may be connected to several user devices located at various locations and several databases via the one or more communication networks 120.

Those of ordinary skilled in the art will appreciate that the hardware depicted in FIG. 1 may vary for particular implementations. For example, other peripheral devices such as an optical disk drive and the like, the local area network (LAN), the wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the system 102 as is unique to the present disclosure or necessary for an understanding of the present disclosure is depicted and described. The remainder of the construction and operation of the system 102 may conform to any of the various current implementations and practices that were known in the art.

Figure 2A:
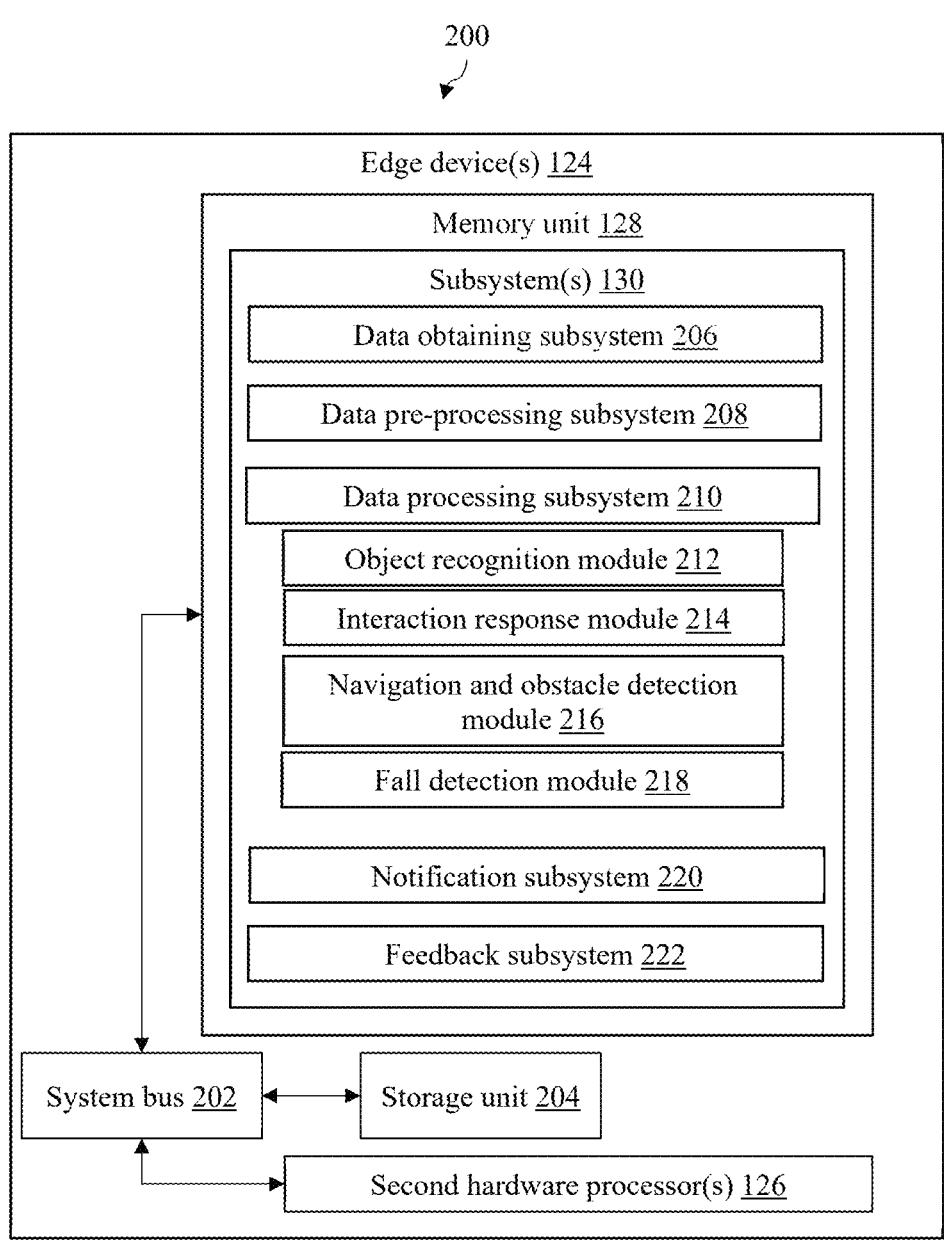
FIGS. 2A and 2B illustrate exemplary block diagram representations of the system as shown in FIG. 1 for providing the one or more real-time insights to the user, in accordance with an embodiment of the present disclosure.
Figure 2B:
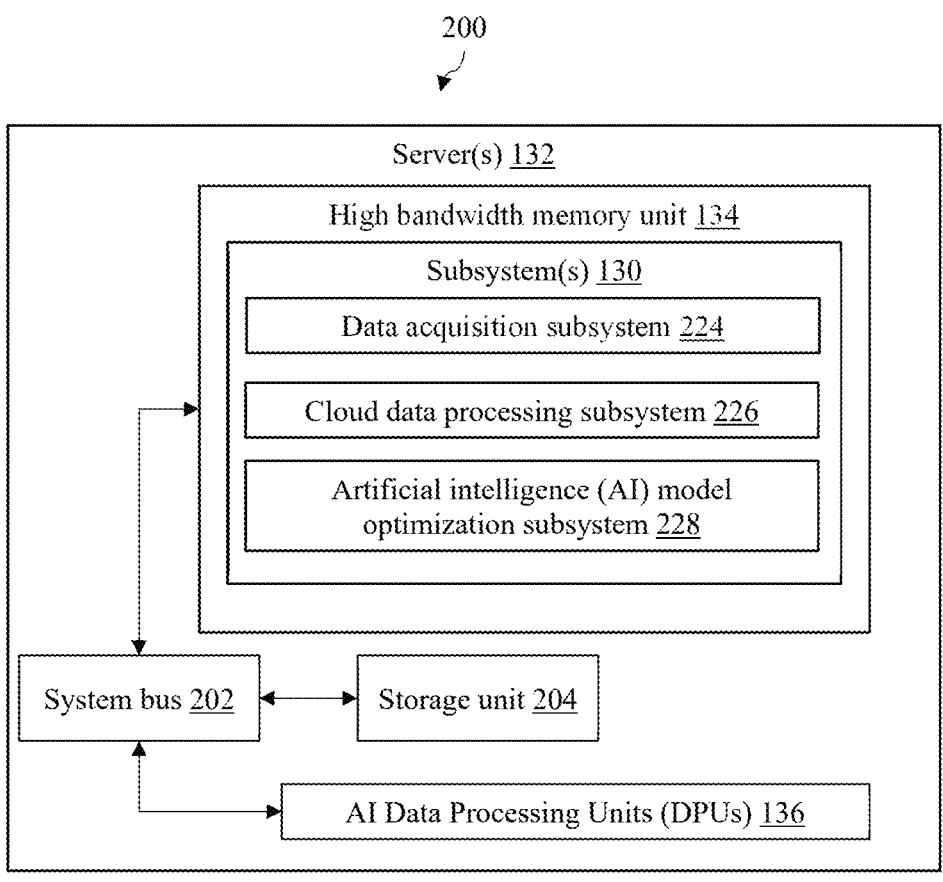

FIGS. 2A and 2B illustrate exemplary block diagram representations 200 of the system 102 as shown in FIG. 1 for providing the one or more real-time insights to the user, in accordance with an embodiment of the present disclosure.

In an exemplary embodiment, the one or more second hardware processors 126 and the one or more AI DPUs 136, the memory unit 128 and the high bandwidth memory unit

134, and the storage unit 204 are communicatively coupled through a system bus 202 or any similar mechanism. The system bus 202 functions as the central conduit for data transfer and communication between the one or more second hardware processors 126 and the one or more AI DPUs 136, the memory unit 128 and the high bandwidth memory unit 134, and the storage unit 204. The system bus 202 facilitates the efficient exchange of information and instructions, enabling the coordinated operation of the system 102. The system bus 202 may be implemented using various technologies, including but not limited to, parallel buses, serial buses, and high-speed data transfer interfaces such as, but not limited to, at least one of a: universal serial bus (USB), peripheral component interconnect express (PCIe), and similar standards.

In an exemplary embodiment, the memory unit 128 is operatively connected to the one or more second hardware processors 126. The high bandwidth memory unit 134 is operatively connected to the one or more AI DPUs 136. The memory unit 128 and the high bandwidth memory unit 134 comprise the plurality of subsystems 130 in the form of the set of computer-readable instructions executable by the one or more second hardware processors 126 and the one or more AI DPUs 136 respectively. The plurality of subsystems 130 associated with the one or more edge devices 124 comprises a data obtaining subsystem 206, a data pre-processing subsystem 208, a data processing subsystem 210, a notification subsystem 220, and a feedback subsystem 222. The plurality of subsystems 130 associated with the one or more servers 132 comprises a data acquisition subsystem 224, a cloud data processing subsystem 226, and an artificial intelligence (AI) model optimization subsystem 228.

The one or more second hardware processors 126 associated within the one or more edge devices 124, as used herein, means any type of computational circuit, such as, but not limited to, the microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more second hardware processors 126 may also include embedded controllers, such as generic or programmable logic devices or arrays, application-specific integrated circuits, single-chip computers, and the like.

The memory unit 128 may be the non-transitory volatile memory and the non-volatile memory. The memory unit 128 may be coupled to communicate with the one or more second hardware processors 126, such as being a computer-readable storage medium. The one or more second hardware processors 126 may execute machine-readable instructions and/or source code stored in the memory unit 128. A variety of machine-readable instructions may be stored in and accessed from the memory unit 128. The memory unit 128 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory unit 128 includes the plurality of subsystems 130 stored in the form of the set of computer-readable instructions on any of the above-mentioned storage media and may be in communication with and executed by the one or more second hardware processors 126.

The storage unit 204 may be a cloud storage or the one or more databases 122 such as those shown in FIG. 1. The storage unit 204 may store, but not limited to, recommended course of action sequences dynamically generated by the system 102. The action sequences comprise data obtaining, data pre-processing, data processing, transmitting notifications, providing feedback, data acquisition, cloud data processing, artificial intelligence (AI) model optimization, and the like. Additionally, the storage unit 204 may retain previous action sequences for comparison and future reference, enabling continuous refinement of the system 102 over time. The storage unit 204 may be any kind of database such as, but not limited to, relational databases, dedicated databases, dynamic databases, monetized databases, scalable databases, cloud databases, distributed databases, any other databases, and a combination thereof.

In an exemplary embodiment, the data obtaining subsystem 206 is configured to obtain the real-time sensor data directly from each wearable device 104. The data obtaining subsystem 206 ensures that the real-time sensor data is continuously captured and transmitted to the one or more edge devices 124 for immediate analysis. By enabling on-device processing, the system 102 minimizes reliance on the one or more servers 132, reducing latency and ensuring that critical functions such as the obstacle detection, navigation assistance, and the scene understanding operate in real-time. This approach enhances user experience by providing near-instantaneous feedback, making the one or more wearable devices 104 highly efficient for the user who require continuous and reliable assistance.

In an exemplary embodiment, the data pre-processing subsystem 208 is configured to preprocess the obtained real-time sensor data to improve accuracy and usability. The data pre-processing subsystem 208 is configured to, but not limited to, at least one of: denoise the visual data to remove distortions, adjust contrast in the visual data for better object recognition, filter out irrelevant audio data to focus on meaningful sounds, normalise the depth perception data to ensure consistency in the obstacle detection, and the like. By optimizing the real-time sensor data quality, the data pre-processing subsystem 208 significantly enhances the performance of the system 102 for scene interpretation, the speech recognition, and navigation guidance. This ensures that the one or more wearable devices 104 deliver precise and context-aware one or more real-time insights.

In an exemplary embodiment, the data processing subsystem 210 serves as a core intelligence of the one or more wearable devices 104, leveraging at least one of: the one or more machine learning models and one or more artificial intelligence models to analyse the real-time sensor data. The data processing subsystem 210 comprises, but not limited to, at least one of: an object recognition module 212, an interaction response module 214, a navigation and obstacle detection module 216, and a fall detection module 218.

The object recognition module 212 employs a convolutional neural network (CNN) to detect and classify the one or more obstacles in the environmental space by processing at least one of: the visual data, the depth perception data, and the motion tracking data. To optimize performance of the one or more edge devices 124, the CNN comprises, but not constrained to, at least one of: an EfficientDet model, a MobileNet model, a You Only Look Once (YOLO) model, and the like, ensuring high accuracy while maintaining low power consumption.

The EfficientDet model is optimized for edge device inference using a TensorFlow Lite® (TFLite®), By leveraging the TFLite®, the system 102 achieves faster processing, lower power consumption, and seamless on-device execution without cloud dependency. The EfficientDet model is optimized for the one or more edge devices 124 as an on-device processing artificial intelligence model, enabling accurate real-time obstacle recognition with minimal computational overhead. The YOLO model enables ultra-fast real-time object detection, making the YOLO model well-suited for edge-based applications requiring low latency and high responsiveness. The MobileNet model provides lightweight and efficient feature extraction, balancing high accuracy with low computational and power requirements.

The on-device processing artificial intelligence model ensures fast and efficient scene analysis without relying on cloud-based resources. The on-device processing artificial intelligence model is configured to provide the processed feedback data by combining, but not limited to, at least one of: the visual data, the audio data, the depth perception data, and the motion tracking data, with natural language processing (NLP) procedures. By integrating the NLP procedures with the real-time sensor data, the system 102 enhances the scene interpretation, allowing the user to receive detailed, context-aware one or more real-time insights about the surroundings.

In an exemplary embodiment, the interaction response module 214 is configured to generate one or more contextual responses for the user by analysing the visual data and the audio data. The interaction response module 214 processes the visual data and the audio data using at least one of: one or more multi-modal artificial intelligence language models and one or more text recognition models, enabling a highly interactive and intelligent assistance system. The one or more multi-modal artificial intelligence language models are configured to provide a comprehensive understanding of the environmental space. By interpreting the surroundings beyond simple object detection, the system 102 may describe scenes, answer one or more queries, and assist with real-time navigation.

The one or more multi-modal artificial intelligence language models may comprise, but not restricted to, at least one of: vision-language models, multi-modal transformer models, artificial intelligence (AI)-driven fusion networks, and the like. The one or more vision-language models combine the visual data with natural language understanding, allowing the system 102 to generate descriptive text from the visual data. The multi-modal transformer models use deep learning techniques to analyse relationships between different data types, improving accuracy in real-world scenarios. The AI-driven fusion networks integrate multiple sensor inputs to create a unified interpretation of the surroundings. In another exemplary embodiment, the one or more multi-modal artificial intelligence language models that may run on the one or more edge devices 124 may include, but not restricted to, at least one of: Fast Vision-Language Model 500 million and 1.5 billion parameters (FastVLM 0.5B and 1.5B), Gemma 3n Efficient 2 Billion parameters (E2B) and E4B, Qwen Version 2 Vision-Language model (Qwen2 V1) 2B and 3B, and the like.

The one or more text recognition models may comprise, but not constricted to, at least one of: optical character recognition (OCR), handwriting recognition models, the one or more text to speech models, and the like. The one or more text recognition models are configured to read and interpret textual information. The OCR extracts and converts one of: printed text and handwritten text into speech, while the handwriting recognition models allow for real-time transcription of the handwritten text. The one or more text to speech models further enhance accessibility by converting detected text into natural-sounding voice feedback, ensuring that the user may understand written information effortlessly.

In an exemplary embodiment, the navigation and obstacle detection module 216 is configured to process the depth perception data and the visual data to assist the user in safely navigating the environment. The navigation and obstacle detection module 216 employs a predictive motion model to analyse movement patterns and detect potential one or more obstacles in real-time. Based on the analysis, the system 102 generates the processed feedback data, which is conveyed to the user through at least one of: real-time haptic feedback and audio feedback. The navigation and obstacle detection module 216 assists the user in understanding the proximity and nature of the one or more obstacles, ensuring smooth navigation. The real-time haptic feedback further enhances user awareness by providing the distinct vibration patterns corresponding to different one or more obstacles and navigation instructions. The distinct vibration patterns allow the user to differentiate between various alerts, such as an approaching object and a required directional change, making the one or more wearable devices 104 effective tools for independent mobility. The integration of both tactile cues and auditory cues allows for an intuitive and multi-sensory approach to guiding the user through complex environments.

The predictive motion model comprises, but not constricted to, at least one of: recurrent neural network (RNN)-based motion prediction models, Kalman filtering-based motion estimation models, light detection and ranging (LiDAR)-based dynamic movement tracking, and the like. The RNN-based motion prediction models are configured to analyse sequential movement data to anticipate a trajectory of the user and predict the potential one or more obstacles. The Kalman filtering-based motion estimation models are configured to provide real-time corrections to movement predictions by continuously refining location estimates based on the real-time sensor data. The LiDAR-based dynamic movement tracking employs the LiDAR sensor to enable precise distance calculations, ensuring accurate obstacle detection even in the dynamic environments.

In an exemplary embodiment, the fall detection module 218 is configured to identify abrupt motion changes that indicate a potential fall event. The fall detection module 218 processes the motion tracking data and employs vision-based gait analysis to monitor walking patterns of the user in real time. By continuously analysing the movements of the user, the system 102 may detect abnormalities, such as unsteady steps and sudden shifts in posture, which may suggest an impending fall. When the fall event is detected, the fall detection module 218 may trigger immediate one or more alert notifications to inform at least one of: one or more caregivers and one or more preregistered emergency contacts, ensuring timely assistance for the user.

To enhance accuracy and minimize false alarms, the fall detection module 218 incorporates a multi-sensor fusion procedure, which integrates the motion tracking data, the visual data, and the depth perception data. The multi-sensor fusion procedure reduces the likelihood of misinterpreting routine movements, such as bending and sitting down, as the fall event. The vision-based gait analysis further refines a detection process by identifying abnormal walking patterns and predicting fall risks before the fall event occurs. This comprehensive approach ensures reliable and proactive fall detection, significantly improving safety and independence for the user.

In another exemplary embodiment, the system 102 operatively connected to the one or more servers 132 for enable high-performance, cloud-based processing, long-term data storage, model optimization, and real-time synchronization with the one or more wearable devices 104 and the one or more edge devices 124. While the one or more edge devices 124 perform most of the on-device processing for low-latency insights and real-time feedback, the one or more servers 132 provide additional computational resources for deep learning model training, advanced AI inference, personalized analytics, and continuous improvements to the system's artificial intelligence models.

The one or more servers 132 may comprise but not limited to, at least one of: cloud servers, dedicated AI processing servers, high-performance computing clusters (HPC), federated learning nodes, distributed database systems, and the like. The one or more servers 132 facilitate periodic synchronization and adaptive learning updates for the one or more wearable devices 104 and the one or more edge devices 124, ensuring that the system 102 evolves and improves its performance over time.

Data transmission between the system 102 and the one or more servers 132 occurs via secure, high-bandwidth communication channels, such as Wi-Fi, 5G, LTE, or low-power wide-area network (LPWAN) protocols. The system 102 implements end-to-end encryption and differential privacy techniques to protect user data during transmission. The one or more servers 132 are also responsible for processing complex queries, generating large-scale contextual insights, and providing historical data analysis that cannot be efficiently handled by the one or more edge devices 124 due to their computational and power limitations. Additionally, the one or more servers 132 facilitate multi-user accessibility, remote assistance capabilities, and cloud-based emergency alert services by maintaining a continuous connection with pre-registered emergency contacts and caregivers.

In an exemplary embodiment, the one or more servers 132 comprise the data acquisition subsystem 224 is configured to obtain the pre-processed sensor data and transmit the pre-processed sensor data for cloud-based processing in the one or more servers 132 for further analysis. By leveraging the cloud-based processing, the system 102 may perform computationally intensive tasks that go beyond the capabilities of the one or more edge devices 124, enabling a deeper and more sophisticated understanding of the environmental space. The data acquisition subsystem 224 ensures that the pre-processed sensor data is efficiently acquired and formatted. By offloading complex tasks to the one or more servers 132, the one or more wearable devices 104 may maintain optimal performance, extending battery life while still delivering highly accurate, real-time assistance to the user.

The cloud data processing subsystem 226 is configured with, but not constrained to, at least one of: the one or more machine learning models, one or more large language models (LLMs), one or more conversational artificial intelligence models, one or more speech recognition models, one or more text to speech models, and the like, for complex processing of the sensor data to generate the processed feedback data. The one or more LLMs are deep-learning models trained on vast amounts of data to understand and generate human-like text. The one or more conversational artificial intelligence models enhance user interaction by enabling natural and intuitive dialogues between the one or more wearable devices 104 and the user.

The one or more conversational artificial intelligence models may comprise, but not limited to, at least one of: the one or more large language models (LLMs), artificial intelligence (AI)-powered natural language understanding (NLU) modules, task-oriented dialogue models, emotion-aware artificial intelligence (AI) models, and the like. The AI-powered NLU modules analyse spoken and text-based inputs to interpret user intent. The task-oriented dialogue models guide the user through specific actions such as navigation assistance and object identification. The emotion-aware AI models may adjust responses based on an emotional state of the user, enhancing the usability and personalisation of the one or more wearable devices 104.

The one or more speech recognition models may comprise, but not constrained to, at least one of: end-to-end deep learning-based automatic speech recognition (ASR) models, noise-resistant speech-to-text models, multi-language voice recognition engines, wake-word detection models, and the like. The end-to-end deep learning-based ASR models accurately transcribe spoken input, allowing the user to interact with the one or more wearable devices 104 through the voice commands. The noise-resistant speech-to-text models filter out background noise, ensuring clear and accurate voice recognition even in challenging environments. Additionally, the multi-language voice recognition engines support diverse linguistic needs, enabling the user to interact with the one or more wearable devices 104 in a preferred language. The wake-word detection models allow the user to activate the one or more wearable devices 104 hands-free using predefined trigger phrases.

In an exemplary embodiment, the AI model optimization subsystem 228 is configured to enhance the efficiency and performance of at least one of: the one or more machine learning models, the one or more artificial intelligence models, the one or more LLMs, the one or more conversational artificial intelligence models, the one or more speech recognition models, and the one or more text to speech models running on at least one of: the one or more edge devices 124 and the one or more servers 132. The AI model optimization subsystem 228 ensures that computational workloads are balanced between local processing and cloud-based execution. This optimization significantly reduces latency, improves responsiveness, and extends battery life of the one or more wearable devices 104 while maintaining high accuracy in at least one of: the real-time scene understanding, the speech recognition, and assistive navigation. The ability to fine-tune and adapt models dynamically allows for a more personalised and adaptive user experience, especially for the user who rely on timely and precise feedback.

The AI model optimization subsystem 228 integrates a federated learning framework and a model compression engine. The federated learning framework enables at least one of: the one or more machine learning models, the one or more artificial intelligence models, the one or more LLMs, the one or more conversational artificial intelligence models, the one or more speech recognition models, and the one or more text to speech models to be trained and updated locally on the one or more edge devices 124 without needing to send raw data to the one or more servers 132, thereby ensuring privacy and reducing network dependency. These locally trained models are periodically synchronized with the one or more servers 132, allowing global improvements while maintaining personalised optimizations for the user. This distributed learning approach ensures continuous adaptation to user behaviour, improving model performance over time.

The model compression engine enhances efficiency by dynamically compressing the size of at least one of: the one or more machine learning models and the one or more artificial intelligence models. The model compression engine employs quantization, which converts high-precision numerical representations into lower-bit formats to reduce computational load, and pruning, which eliminates unnecessary model parameters to enhance processing speed. These techniques enable optimized AI inference on the one or more edge devices 124, allowing the one or more wearable devices 104 to operate efficiently without sacrificing accuracy.

In an exemplary embodiment, the notification subsystem 220 associated with the one or more edge devices 124 is configured to ensure the safety of the user by transmitting the one or more alert notifications to the one or more preregistered emergency contacts in the event of the abrupt motion changes, such as a detected fall. Upon identifying an unusual motion pattern through the fall detection module 218, the system 102 automatically generates the alerts containing real-time location coordinates of the user. This feature allows at least one of: the one or more caregivers and the one or more preregistered emergency contacts to quickly locate and assist the user, enhancing security and independence. The integration of Global Positioning System (GPS)-based tracking ensures precise positioning, making the notification subsystem 220 a vital component for real-time emergency response and accident prevention.

In an exemplary embodiment, the feedback subsystem 222 associated with the one or more edge devices 124 is configured to transfer the processed feedback to each wearable device 104 via the RF communication unit. This ensures that the user receives real-time guidance regarding navigation, object detection, and scene understanding. Once the real-time sensor data is processed on at least one of: the one or more edge devices 124 and the one or more servers 132, the feedback subsystem 222 transmits the relevant information back to the user in the form of at least one of: the audio cues (e.g., speech output, subtle beeps, recognizable sounds), haptic feedback (e.g., haptic vibrations), and visual alerts.

FIG. 3 illustrates an exemplary flow diagram representation depicting a method 300 for providing the one or more real-time insights to the user, in accordance with an embodiment of the present disclosure.

According to another exemplary embodiment of the disclosure, the method 300 for providing the one or more real-time insights to the user is disclosed. At step 302, the method 300 begins by generating the real-time sensor data using the plurality of sensors integrated into each wearable device. The real-time sensor data may comprise, but not restricted to, at least one of: the visual data captured by the visual data capturing unit, the audio data recorded by the audio input unit, the depth perception data from the LiDAR sensor, the motion tracking data to accurately monitor the movements of the user, and the like.

At step 304, the method 300 includes the first hardware processor that efficiently manages the electric power distribution across the one or more wearable devices to ensure optimal performance. The first hardware processor regulates energy flow from the power supply unit through the PMU, prioritising essential components. This includes supplying the electric power to, but not constrained to, at least one of: the plurality of sensors, the one or more haptic feedback units, the one or more audio output units associated with the plurality of sensors, the one or more input control units, and the RF communication unit.

At step 306, the method 300 includes the first hardware processor that transmits the real-time sensor data using the RF communication unit for further processing. The real-time sensor data is transmitted to at least one of: the one or more edge devices and the one or more servers, depending on computational requirements and network availability. The one or more edge devices handle low-latency tasks, ensuring real-time responsiveness, while the one or more servers perform complex AI-driven analysis.

At step 308, the method 300 includes the one or more second hardware processors within the one or more edge devices that retrieve the real-time sensor data from each wearable device through the data obtaining subsystem. This step 308 ensures that the real-time sensor data is efficiently collected for processing. By performing the on-device processing, the one or more edge devices reduce dependency on cloud computing, enabling faster response times and low-latency feedback.

At step 310, the method 300 includes the one or more second hardware processors that execute data preprocessing through the data pre-processing subsystem to enhance the quality of the real-time sensor data. This involves at least one of: denoising the visual data to remove distortions, adjusting the contrast in the visual data for improved clarity, and filtering the irrelevant audio data for accurate speech recognition. Additionally, the depth perception data is normalised, ensuring consistency in the obstacle detection and spatial awareness for the user.

At step 312, the method 300 includes analysing the real-time sensor data using the one or more second hardware processors within the data processing subsystem for intelligent decision-making. This analysis leverages at least one of: the one or more machine learning models and the one or more artificial intelligence models to interpret the real-time sensor data. AI-driven processing enables the accurate obstacle detection, the scene understanding, and adaptive user interactions based on environmental inputs.

The object recognition module associated with the data processing subsystem identifies and classifies the one or more obstacles in the environmental space by processing at least one of: the visual data, the depth perception data, and the motion tracking data. The object recognition module employs the CNN to detect the one or more obstacles with high accuracy, ensuring the user receives real-time alerts about the nearby one or more obstacles.

The interaction response module associated with the data processing subsystem generates the one or more contextual responses by analysing the visual data and the audio data using at least one of: the one or more multi-modal artificial intelligence language models and the one or more text recognition models. This allows the system to provide scene descriptions, text-to-speech conversions, and interactive responses, enabling the user to understand the environment and engage with the environment more effectively.

The navigation and obstacle detection module associated with the data processing subsystem processes the depth perception data and the visual data using the predictive motion model to generate at least one of: the real-time haptic feedback and the audio feedback. This ensures that the user receives timely alerts about potential hazards, thereby guiding the user safely through the dynamic environments.

The fall detection module associated with the data processing subsystem continuously monitors the motion tracking data and performs the vision-based gait analysis to detect the abrupt motion changes indicative of the fall event. If the fall event is identified, the system may trigger emergency one or more alert notifications, ensuring immediate assistance for the user.

At step 314, the method 300 includes the one or more AI DPUs within the one or more servers that retrieve the pre-processed sensor data via the data acquisition subsystem for cloud-based analysis. This enables high-complexity AI processing, leveraging advanced models to enhance the scene understanding, navigation, and the user interaction.

At step 316, the method 300 includes the one or more AI DPUs that perform complex processing on the sensor data using the cloud data processing subsystem to generate the processed feedback data. This involves leveraging, but not limited to, at least one of: the one or more machine learning models, the one or more LLMs, the one or more conversational artificial intelligence models, the one or more speech recognition models, the one or more text to speech models, and the like, for enhanced user interaction.

At step 318, the method 300 includes the one or more AI DPUs that optimize at least one of: the one or more machine learning models, the one or more artificial intelligence models, the one or more LLMs, the one or more conversational artificial intelligence models, the one or more speech recognition models, and the one or more text to speech models through the AI model optimization subsystem, ensuring efficient and adaptive processing. By fine-tuning and adapting models for at least one of: the one or more edge devices and the one or more servers, the system enhances real-time responsiveness, computational efficiency, and power management.

At step 320, the method 300 includes the notification subsystem transmitting the one or more alert notifications to the one or more pre-registered emergency contacts when the abrupt motion changes indicate the potential fall. The one or more alert notifications include the real-time location coordinates of the user, ensuring quick assistance and response. By enabling automated emergency one or more alert notifications, the system enhances user safety and provides immediate support in critical situations.

At step 322, the method 300 includes the feedback subsystem transferring the processed feedback data to the RF communication unit of each wearable device. This ensures seamless delivery of the one or more real-time insights, navigation assistance, and obstacle alerts to the user.

At step 324, the method 300 includes the first hardware processor that receives the processed feedback data from at least one of: the one or more edge devices and the one or more servers via the RF communication unit. The processed feedback data includes the one or more real-time insights, such as, but not constrained to, at least one of: the navigation assistance, the obstacle detection, and the scene descriptions, enhancing the environmental awareness of the user. By ensuring seamless data reception, the system enables timely and accurate assistive feedback, improving mobility and safety for the user.

Numerous advantages of the present disclosure may be apparent from the discussion above. In accordance with the present disclosure, the system for providing the one or more real-time insights to the user is disclosed. The system is configured with AI-based context-aware OCR with real-time translation and interactive query and response based on the text. The system provides an AI-powered scene interpretation with predictive analytics for real-world interactions. The system alerts the user about the one or more obstacles dynamically. The system triggers automatic one or more alert notifications (Save Our Souls (SOS) alerts) to at least one of: the one or more caregivers and the one or more preregistered emergency contacts. The system allows the user to ask the one or more queries such as, "What is happening in front of me?", "How many people are in this room?", "Where is the nearest exit?", and the like.

The system provides the on-device AI processing hence no internet dependency. The system extends battery life of the one or more wearable devices up to 8 hours to 10 hours. All the models are configured for offline (on-device) execution, enabling core functionality even without a constant internet connection. The one or more machine learning models are continuously refined based on the user interactions, improving the object recognition and navigation strategies over time. The one or more wearable devices prioritize energy-efficient components and smart power management techniques, significantly extending the battery life. The one or more obstacles detected by the one or more machine learning models are, but not limited to, at least one of: a book, a person, a cell phone, a blind stick, a comb, a pen, a bottle, and the like. The system provides the user with the alerts about the nearby one or more obstacles and aids in determining a spatial layout of the environment, making navigation easier and safer.

The system is configured to perform certain tasks offline (on-device) such as: the object detection, document scanner, text recognition and optical character recognition, face detection and recognition, currency detection, Quick Response (QR) code scanner, light intensity detector (digital), hand and finger tracking, hand gesture recognition, the speech recognition, text to speech, and voice activity detection.

The system detects road signs and identifies grocery labels with brand recognition. The system performs real-time translation and speech recognition with local language support (not dependent on the one or more servers). The system is configured with the ability to answer the one or more queries about the environment using image-based AI-driven query resolution. The system detects moving and stationary one or more obstacles (e.g., detecting a pedestrian and vehicle approaching from a side).

The system uses past movement patterns to warn of potential collisions. A low-power LiDAR sensor is configured with a 65-degree field of view for longer battery life. Neural Processing employs the TFLite and Open Neural Network Exchange (ONNX)-optimized models to deliver high-speed inference on embedded hardware. These optimizations enable real-time AI performance with low power consumption.

While specific language has been used to describe the invention, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

What is claimed is:

1. A system for providing one or more real-time insights to a user, comprising:

one or more wearable devices, each wearable device of the one or more wearable devices, comprise at least one of:

a plurality of sensors configured to generate real-time sensor data comprises at least one of: visual data, audio data, depth perception data, and motion tracking data; and a first hardware processor operatively connected to the plurality of sensors, configured to:

control optimized electric power distribution from a power supply unit through a power management unit (PMU) to at least one of: the plurality of sensors, one or more haptic feedback units, one or more audio output units, one or more input control units, and a radio frequency (RF) communication unit;

transmit the real-time sensor data via the radio frequency (RF) communication unit to at least one of: one or more edge devices and one or more servers; and receive processed feedback data from at least one of: the one or more edge devices and the one or more servers through the radio frequency (RF) communication unit;

one or more second hardware processors associated with the one or more edge devices;

a memory unit operatively connected to the one or more second hardware processors, wherein the memory unit comprises a set of computer-readable instructions in form of a plurality of subsystems, configured to be executed by the one or more second hardware processors, wherein the plurality of subsystems comprises:

a data obtaining subsystem configured to obtain the real-time sensor data from each wearable device of the one or more wearable devices for on-device processing on the one or more edge devices;

a data pre-processing subsystem configured to preprocess the obtained real-time sensor data, including at least one of: denoising the visual data, altering contrast in the visual data, filtering irrelevant audio data, and normalising the depth perception data; and a data processing subsystem configured to analyse the real-time sensor data through at least one of: one or more machine learning models and one or more artificial intelligence models, wherein the data processing subsystem comprises at least one of:

an object recognition module configured to recognise and classify one or more obstacles in the environmental space by processing at least one of: the visual data, the depth perception data, and the motion tracking data through a convolutional neural network (CNN), wherein the convolutional neural network comprises at least one of: an EfficientDet model, a MobileNet model, and a You Only Look Once (YOLO) model, configured for execution on the one or more edge devices to perform real-time object detection;

an interaction response module configured to generate one or more contextual responses for the user by processing the visual data, the audio data through at least one of: one or more multi-modal artificial intelligence language models and one or more text recognition models;

a navigation and obstacle detection module configured to provide processed feedback data including at least one of: real-time haptic feedback and audio feedback, based on processing the depth perception data and the visual data through a predictive motion model, wherein the real-time haptic feedback comprises discrete vibration patterns produced corresponding to different types of processed feedback data, including one of: proximity of the one or more obstacles and navigation instructions, allowing the user to distinguish between the discrete vibration patterns; and a fall detection module configured to detect abrupt motion changes indicative of a fall event based on the motion tracking data and vision-based gait analysis, wherein the fall detection module comprising a multi-sensor fusion procedure configured to combine the motion tracking data, the visual data, and the depth perception data to alleviate false positives in detection of the abrupt motion changes;

one or more artificial intelligence (AI) data processing units (DPUs) associated with the one or more servers;

a high bandwidth memory unit operatively connected to the one or more artificial intelligence (AI) data processing units (DPUs), wherein the high bandwidth memory unit comprises the set of computer-readable instructions in form of the plurality of subsystems, configured to be executed by the high bandwidth memory unit, wherein the plurality of subsystems comprises:

a data acquisition subsystem configured to obtain the pre-processed sensor data for the cloud-based processing in the one or more servers;

a cloud data processing subsystem configured with at least one of: the one or more machine learning models, one or more large language models (LLMs), one or more conversational artificial intelligence models, one or more speech recognition models, and one or more text to speech models, for complex processing of the sensor data to generate the processed feedback data; and an artificial intelligence (AI) model optimization subsystem configured to optimise at least one of: the one or more machine learning models, the one or more artificial intelligence models, the one or more large language models (LLMs), the one or more conversational artificial intelligence models, the one or more speech recognition models, and the one or more text to speech models, for providing an optimized processing performance on at least one of: the one or more edge devices and the one or more servers;

a notification subsystem associated with the one or more edge devices configured to transmit one or more alert notifications to one or more preregistered emergency contacts with location coordinates of the user upon detection of the abrupt motion changes; and a feedback subsystem associated with the one or more edge devices configured transfer the processed feedback data to the radio frequency (RF) communication unit associated with each wearable device of the one or more wearable devices for providing the one or more real-time insights to the user.

2. The system as claimed in claim 1, wherein the one or more real-time insights comprise at least one of: assistive navigation, scene understanding, real-time environmental interaction.

3. The system as claimed in claim 1, wherein the one or more wearable devices are selected from a group comprises at least one of: a pair of smart glasses, a headgear, a headband, a chest-mounted device, a wearable pendant, a smart watch, an wrist worn device, a cane, shoes, and earbuds.

4. The system as claimed in claim 1, wherein the plurality of sensors comprise at least one of:

a visual data capturing unit configured to capture the visual data in the environmental space;

an audio input unit (110a) configured to record ambient audio signals to generate the audio data for at least one of: speech recognition, sound classification, and environmental awareness;

an obstacle detection unit configured to generate the depth perception data by computing a distance between the user and the one or more obstacles for detecting the one or more obstacles in the environmental space; and an inertial measurement unit (IMU) configured to determine acceleration and orientation of the user for generating the motion tracking data.

5. The system as claimed in claim 1, wherein the convolutional neural network (CNN) is optimized for the one or more edge devices as an on-device processing artificial intelligence model, the on-device processing artificial intelligence model configured to provide the processed feedback data by combining at least one of: the visual data, the audio data, the depth perception data, and the motion tracking data, with natural language processing (NLP) procedures.

6. The system as claimed in claim 1, wherein the one or more multi-modal artificial intelligence language models comprise at least one of: vision-language models, multi-modal transformer models, and artificial intelligence (AI)-driven fusion networks;

the one or more text recognition models comprise at least one of: optical character recognition (OCR), handwriting recognition models, and the one or more text to speech models;

the predictive motion model comprises at least one of: recurrent neural network (RNN)-based motion prediction models, Kalman filtering-based motion estimation models, and light detection and ranging (LiDAR)-based dynamic movement tracking;

the one or more conversational artificial intelligence models comprise at least one of:

the one or more large language models (LLMs), artificial intelligence (AI)-powered natural language understanding (NLU) modules, task-oriented dialogue models, and emotion-aware artificial intelligence (AI) models; and the one or more speech recognition models comprise at least one of: end-to-end deep learning-based automatic speech recognition (ASR) models, noise-resistant speech-to-text models, multi-language voice recognition engines, and wake-word detection models.

7. The system as claimed in claim 1, wherein the fall detection module comprises the vision-based gait analysis configured to detect abnormal walking patterns of the user to predict the fall event.

8. The system as claimed in claim 1, wherein the artificial intelligence (AI) model optimization subsystem comprises:

a federated learning framework configured to train and update at least one of: the one or more machine learning models, the one or more artificial intelligence models, the one or more large language models (LLMs), the one or more conversational artificial intelligence models, the one or more speech recognition models, and the one or more text to speech models locally on the one or more edge devices while periodically synchronizing updates with the one or more servers; and a model compression engine configured to dynamically condense size of at least one of: the one or more machine learning model and the one or more artificial intelligence models through at least one of: quantization and pruning to provide the optimized processing performance on the one or more edge devices.

9. A method for providing one or more real-time insights to a user, comprising:

generating, by a plurality of sensors associated with each wearable device of the one or more wearable devices, real-time sensor data comprises at least one of: visual data, audio data, depth perception data, and motion tracking data;

controlling, by a first hardware processor associated with each wearable device of the one or more wearable devices, optimized electric power distribution from a power supply unit through a power management unit (PMU) to at least one of: the plurality of sensors, one or more haptic feedback units, one or more audio output units (110b) associated with the plurality of sensors, one or more input control units, and a radio frequency (RF) communication unit;

transmitting, by the first hardware processor, the real-time sensor data via the radio frequency (RF) communication unit to at least one of: one or more edge devices and one or more servers;

obtaining, by one or more second hardware processors associated with the one or more edge devices through a data obtaining subsystem, the real-time sensor data from each wearable device of the one or more wearable devices for on-device processing on the one or more edge devices;

preprocessing, by the one or more second hardware processors through a data pre-processing subsystem, the obtained real-time sensor data, including at least one of: denoising the visual data, altering contrast in the visual data, filtering irrelevant audio data, normalising the depth perception data;

analysing, by the one or more second hardware processors through a data processing subsystem, the real-time sensor data through at least one of: one or more machine learning models and one or more artificial intelligence models, the analysing comprises:

recognising, by an object recognition module, one or more obstacles in the environmental space by processing at least one of: the visual data, the depth perception data, and the motion tracking data through a convolutional neural network (CNN), wherein the convolutional neural network comprises at least one of: an EfficientDet model, a MobileNet model, and a You Only Look Once (YOLO) model, for execution on the one or more edge devices to perform real-time object detection;

generating, by an interaction response module, one or more contextual responses for the user by processing the visual data, the audio data through at least one of: one or more multi-modal artificial intelligence language models and one or more text recognition models;

providing, by a navigation and obstacle detection module, the processed feedback data including at least one of: real-time haptic feedback and audio feedback, based on processing the depth perception data, the visual data through a predictive motion model, wherein the real-time haptic feedback comprises discrete vibration patterns produced corresponding to different types of processed feedback data, including one of: proximity of the one or more obstacles and navigation instructions, allowing the user to distinguish between the discrete vibration patterns; and detecting, by a fall detection module, abrupt motion changes indicative of a fall event based on the motion tracking data and vision-based gait analysis, wherein the detecting comprises combining the motion tracking data, the visual data, and the depth perception data through a multi-sensor fusion procedure to alleviate false positives in detection of the abrupt motion changes;

obtaining, by one or more artificial intelligence (AI) data processing units (DPUs) associated with the one or more servers through a data acquisition subsystem, the pre-processed sensor data for the cloud-based processing in the one or more servers;

complex processing, by the one or more artificial intelligence (AI) data processing units (DPUs) through a cloud data processing subsystem, the sensor data to generate the processed feedback data through at least one of: the one or more machine learning models, one or more large language models (LLMs), one or more conversational artificial intelligence models, one or more speech recognition models, and one or more text to speech models;

optimising, by the one or more artificial intelligence (AI) data processing units (DPUs) through an artificial intelligence (AI) model optimization subsystem, at least one of: the one or more machine learning models, the one or more artificial intelligence models, the one or more large language models (LLMs), the one or more conversational artificial intelligence models, the one or more speech recognition models, and the one or more text to speech models, for providing an optimized processing performance on at least one of: the one or more edge devices and the one or more servers;

transmitting, by a notification subsystem, one or more alert notifications to one or more preregistered emergency contacts with location coordinates of the user upon detection of the abrupt motion changes;

transferring, by a feedback subsystem, the processed feedback data to the radio frequency (RF) communication unit associated with each wearable device of the one or more wearable devices; and receiving, by the first hardware processor associated with each wearable device of the one or more wearable devices, the processed feedback data from at least one of: the one or more edge devices and the one or more servers through the radio frequency (RF) communication unit to provide the one or more real-time insights to the user.

* * * * *